United States Patent [19]

Sharkey et al.

[11] Patent Number: 4,837,584

[45] Date of Patent: Jun. 6, 1989

[54] SECURITY TIME CLOCK SYSTEM

[75] Inventors: Richard B. Sharkey, New York; Robert T. Emerson, Manhasset, both of N.Y.

[73] Assignee: Leedall Products, Inc., New York, N.Y.

[21] Appl. No.: 140,567

[22] Filed: Jan. 4, 1988

Related U.S. Application Data

[63] Continuation-in-part of Ser. No. 51,510, May 8, 1987, abandoned.

[51] Int. Cl.[4] .............................................. G01D 9/00

[52] U.S. Cl. ...................................... 346/1.1; 346/19; 346/20; 346/46; 346/47; 340/80; 340/82; 340/83; 340/85; 340/96; 283/95; 283/72

[58] Field of Search ...................... 346/1.1, 19, 20, 46, 346/47, 80, 82, 83, 85, 96; 283/95, 72; 101/DIG. 1

[56] References Cited

U.S. PATENT DOCUMENTS 4,186,243 1/1980 Astbury et al. ..................... 101/469

4,227,199 10/1980 Sharkey .............................. 346/1.1

*Primary Examiner*—E. A. Goldberg

*Assistant Examiner*—Huan H. Tran

*Attorney, Agent, or Firm*—Perman & Green

[57] ABSTRACT

System for requiring the contemporaneous application of time clock data and personal data to a time card to prevent or signal the fraudulent application of either type of data at a time which is substantially different from the other type of data, i.e., by up to about 15 minutes. The present system includes the use of time cards having at least one color-forming chemical which may be in the form of a discontinuous coating, time clock transfer elements which may be coated with at least one complimentary color-forming chemical, pre-application of a liquid coating to the data-receiving area of the time card, which liquid coating permits the desired color-forming reaction only while it is liquid and which dries under ambient conditions before about 15 minutes, and the use of a signature-applying implement containing a special ink including at least one color-forming chemical and/or a mixture thereof with a transparent dye or pigment. The special ink forms multi-colored signatures when applied to the discontinuous time card coating, according to a preferred embodiment.

23 Claims, 2 Drawing Sheets

SECURITY TIME CLOCK SYSTEM

The present invention is an improvement over the related system of U.S. Pat. No. 4,227,199, and the present application is a continuation-in-part of co-pending application, Ser. No. 51,510 filed May 8, 1987, now abandoned.

BACKGROUND OF THE INVENTION

U.S. Pat. No. 4,227,199 is concerned with avoiding the problem of employee fraud, whereby one employee can insert the time card of another employee into a time clock to record entry and/or exit times for said other employee when, in fact, said other employee was absent at those recorded times.

According to U.S. Pat. No. 4,227,199, such possibility for cooperative fraud is overcome or avoided by replacing the ink-transfer ribbon of the time clock with a ribbon which transfers a colorless color-forming chemical, and wetting the time card with a liquid, evaporable coating containing a complimentary color-forming chemical which reacts with the time clock applied chemical and also reacts with a color-forming chemical present in a writing implement, such as a ball point pen, used by each employee to apply his or her signature whenever punching in or out. Thus, both the time clock data and the signature must be applied contemporaneously, before the liquid coating dries, i.e., within a few minutes of each other, to prove that each particular employee was present at the recorded entry and exit times.

While the system of U.S. Pat. No. 4,227,199 is operative in the manner indicated and for its intended purpose, it does not completely avoid the possibility of frauds. Since the time cards used in such system are conventional, untreated time cards, it is possible for the owner to punch in and sign at entry time, and to smear the colorless liquid coating with his finger so that he can write his signature a second time, below the first signature. Then a cooperative fellow employee can punch the owner's card at exit time and the earlier-applied second signature will make it appear that the owner was present at exit time. Other possibilities for fraud also exist.

SUMMARY OF THE INVENTION

The present invention relates to improvements in the system of U.S. Pat. No. 4,227,199 whereby the drying of the applied liquid coating masks, desensitizes or discolors the areas of the time card to which it is applied whereby the signature area is masked, desensitized and/or discolored to provide a clear indication or obliteration of pre-applied signatures and/or to prevent the later application of time stamps and/or signatures.

As essential feature of the present invention is the use of special time cards which are precoated with a receptive layer containing at least one reactive chemical which normally participates in the color-forming chemical reaction. Another essential feature of the present invention is the use of a wetting composition which, when wet, permits the time stamp chemical and the written signature chemical to react with the time card coating to produce colored time stamp and signature indicia but which, after drying either discolors, masks, seals or desensitizes the coated areas, including pre-applied signatures, whereby pre-applied signatures are discolored or masked and time stamps cannot be later recorded therethrough.

A preferred embodiment of the present invention involves the use of special time cards which carry, at least in the signature areas thereof, a discontinuous coating containing at least one reactive chemical which normally participates in the color-forming reaction upon contact with at least one color-forming chemical present in the special ink used to write the signature. The other portions of the signature areas of the time card immediately adjacent and between the discontinuous coating portions are either uncoated or comprise a different coating, to provide signature area portions which develop or acquire a color different from that developed in the discontinuous coating areas upon contact with the special ink used to write the signature. The end result is a full multiple color signature consisting of segments of different colors which signature is impossible to duplicate or forge by means of different colored inks without obvious detection.

THE DRAWING

Figure 4:
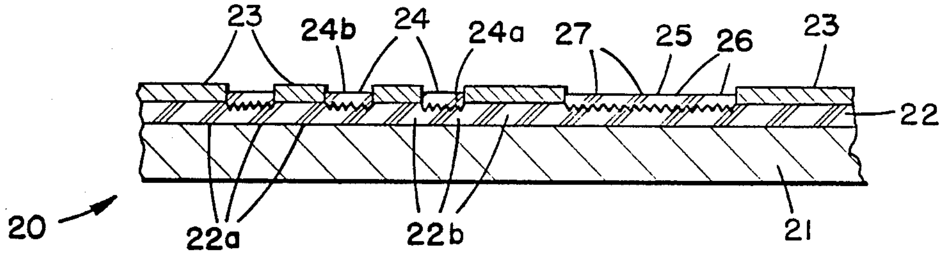
Figure 5:
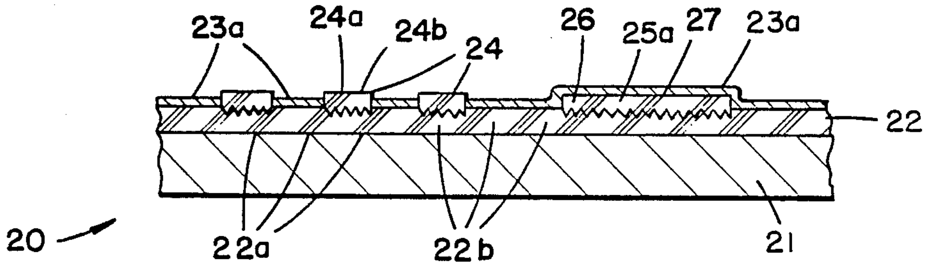
Figure 6:
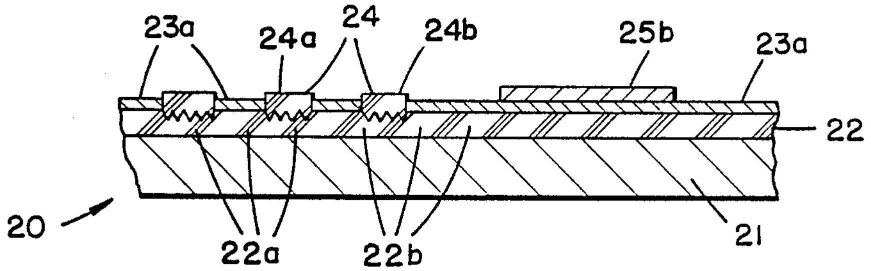

FIG. 4 is a diagrammatic cross-section, to an enlarged scale, of a time card carrying a discontinuous coating, according to another embodiment of the present invention, immediately after being time punched and signed, and FIGS. 5 and 6 are view similar to FIG. 4 but illustrating (FIG. 5) a discontinuous-coated time card which has been signed prior to the time that it was wetted and time punched, and (FIG. 6) signed subsequent to drying.

DETAILED DESCRIPTION

For purposes of simplicity, reference is made to U.S. Pat. No. 4,227,199 for its disclosure and/or illustration of conventional time clocks, and wetting devices suitable for use according to the present invention, and their methods of operation.

While the system of the co-pending application is completely operative and represents a substantial improvement over the prior art, it is possible for a fraudulent user to after-apply a signature to a dried, masked signature area of the card using a colored ink having a similar color to the color developed on other areas of the card, i.e., a co-worker can time stamp a friend's time card, in his absence, and the friend can sign the card the next day. While such abuse may be detectable it requires close examination and some possibility for dispute.

Figure 1:
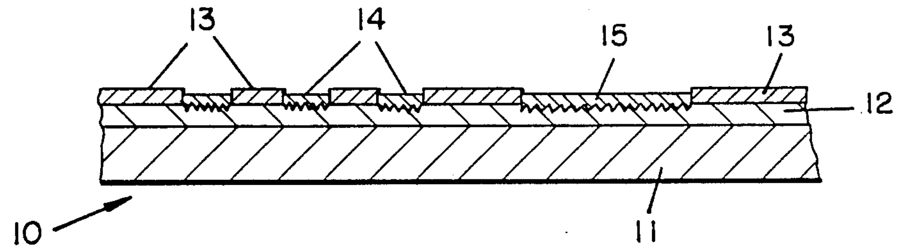
FIG. 1 is a diagrammatic cross-section, to an enlarged scale, of a time card according to one embodiment of the present invention, immediately after being time-punched an signed.

Referring to FIG. 1 of the present drawing, time card 10 comprising a conventional paperboard foundation 11 is precoated with a thin surface layer 12 containing a chemical which is reactive with a chemical present in the time clock ribbon, and possibly with a chemical present in the wetting solution 13, to produce a color-forming reaction in the imaged areas 14 and 15 of layer 23, in which said chemicals are contacted with each other under the effects of imaging pressure applied to the wetted time card by the time clock, in the case of images 14, and by writing pressure, in the case of signature image 15.

Thus, the coated time cards, on which the dry reactive coating 12 covers at least the areas of the front surface if the card to which time clock impressions and signature impressions are to be applied, is first inserted into a wetting device of the type disclosed in U.S. Pat. No. 4,227,199 to apply a wet stripe 13 of liquid composition across only a narrow predetermined area of the card coating 12 to which the next time clock impressions 14 and signature impression 15 are to be applied.

The liquid composition of stripe 13 is one which dries under ambient conditions within a short time, i.e., less than 15 minutes and preferably from within about 1 to 5 minutes, and which leaves a residue which seals, masks, deactivates, discolors or otherwise affects the coating 12 and/or any images which are stamped or written either before the wet stripe 13 is applied and/or after the wet stripe 13 has completely dried.

During proper use, the wetted time card 10 is inserted into the time clock immediately after the card is withdrawn from the wetting device. The time clock impression forces the color-forming chemical from the time clock ribbon through the impressed areas of the wet stripe 13 where it reacts with the contacted areas of the card coating 12 to develop time clock images 14 having a predetermined intense color. Next, the user promptly writes his or her signature adjacent the images 14, using a special pen or pencil containing a color-forming chemical which is also reactive with coating 12, using writing pressure which displaces the impressed areas of the wet stripe 13 to develop signature image 15. Then the time card is stored in its holder where it dries for subsequent use. A special pen may be provided with a colorless reactive ink, i.e., a reactive dye component such as a leuco dye component in a volatile solvent such as isopropyl alcohol, benzyl alcohol or other solvent having the desired evaporation rate. A special pencil may be provided with a "lead" comprising a colorless reactive dye component dispersed or encapsulated within a hard wax binder material and a solid alcohol such as cetyl alcohol, i.e., similar to "leads" used in colored pencils but containing colorless dye components in place of colored dyestuffs.

Figure 2:
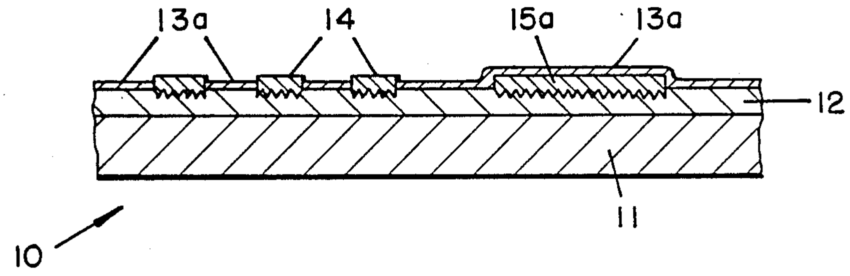
FIGS. 2 and 3 are views similar to FIG. 1 but illustrating (FIG. 2) a similar time card which has been signed prior to the time that it was wetted and time punched, and (FIG. 3) signed subsequent to drying.
Figure 3:
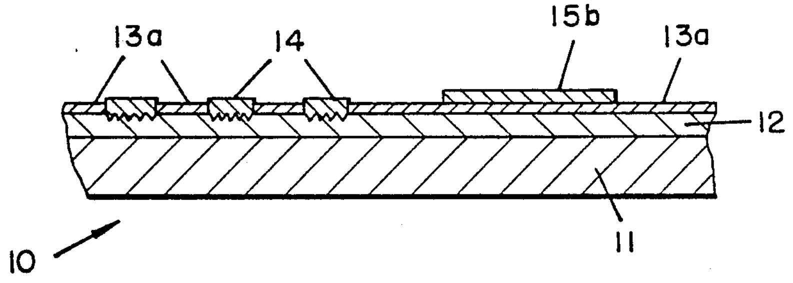

FIGS. 2 and 3 illustrate the effect of misuses of the present time cards. In FIG. 2, the signature image 15*a* is applied to the time card 10 before the card is wetted and time stamped. For example, if a worker signs his card in two places when he leaves work or arrives at work, and a cooperative co-worker later wets the card and time stamps it to cover for the worker who arrives late or leaves early, the wet stripe applied by the wetting device will cover the pre-applied signature 15*a* and the dried coating 13*a* will either mask, discolor or otherwise show that the signature 15*a* was not applied contemporaneously with the time clock images 14.

In FIG. 3, the signature 15*b* has been applied after the time card was wetted, time punched with images 14 and dried to leave the dried residue 13*a* of the wet stripe applied by the wetting device. Residue 13*a* seals, masks and/or deactivates the underlying color-forming card coating 12 so that the color former present in the writing implement used to apply the signature 15*b* is not reactive with the coating 12, or is insulated against reactive contact therewith, so that signature 15*b* is colorless or has or develops a color different from the color which would normally be generated if the signature was applied before the wet stripe dried.

Referring to FIG. 4 of the present drawing, a time card 20 comprising a conventional paperboard foundation 21 is precoated with a thin discontinuous or integrated surface layer 22 containing striped, spotted or other portions 22*a* containing a chemical which is reactive with a chemical present in the time clock ribbon, and possibly with a chemical present in the wetting solution 23, to produce a color-forming reaction in the imaged areas 24*a* and 27 of layer 22, in which said chemicals are contacted with each other under the effects of imaging pressure applied to the wetted time card by the time card by the time clock, in the case of images 24, and by writing pressure, in the case of signature image 25.

The adjacent or interposed or-background areas 22*b* of coating 22 are either uncoated areas or, as illustrated, are coated areas which are non-reactive with the special ink chemical(s) which develop a first color in imaged areas 24*a* and 27 but are reactive with a second chemical in said ink to develop a different color in imaged areas 24*b* and 26 or are receptive to a colored pigment or dye present in the special ink, which colored pigment or dye does not produce its natural color when applied with the said special ink chemicals to image areas 24*a* and 27. The end result is the formation of continuous time clock images 24 consisting of different-colored portions 24*a* and 24*b* and continuous signature images consisting of different colored portions 26 and 27, which images are impossible to forge using different pre-colored inks.

The coated time card, on which the dry reactive coating 22, consisting of portions 22*a* and 22*b*, covers at least the areas of the front surface of the card to which time clock impressions and signature impressions are to be applied, is first inserted into a wetting device of the type disclosed in U.S. Pat. No. 4,227,199 to apply a wet strip 23 of liquid composition across only a narrow predetermined area of the card coating 22 to which the next time clock impressions 24 and signature impression 25 are to be applied.

The liquid composition of strip 23 is one which dries under ambient conditions within a short time, i.e., less than 15 minutes and preferably from within about 1 to 5 minutes, and which leaves a residue which seals, masks, deactivates, discolors or otherwise affects the coating 22 and/or any images which are stamped or written either before the wet strip 23 is applied and/or after the wet stripe 23 has completely dried.

During proper use, the wetted time card 20 is inserted into the time clock immediately after the card is withdrawn from the wetting device. The time clock impression forces the special ink comprising a first color-forming chemical and either a second color-forming chemical or a transparent colored dye or pigment from the time clock ribbon through the impressed areas of the wet stripe 23 where it contacts the impressed areas 22*a* and 22*b* of the card coating 22 to develop or produce time clock images 24 consisting of portions 24*a* and 24*b* having different predetermined intense colors. Next, the user promptly writes his or her signature adjacent the images 24, using a special pen or pencil containing a first color-forming chemical which is reactive with portions 22*a* of coating 22 to develop signature portions 27 having one color, and containing either a second color-forming chemical or transparent colored dye or pigment which is reactive with or produces signature portions 26 having a color different from portions 27, using writing pressure which displaces the impressed areas of the wet stripe 23 to develop or produce multi-colored, continuous signature image 25. Then the time card is stored in its holder where it dries for subsequent use. A special pen may be provided with a colorless reactive ink, i.e., one or more reactive dye components such as an acid-sensitive leuco dye component and an alkali-sensitive diazo dye and coupler in a volatile solvent such as isopropyl alcohol, benzyl alcohol or other solvent having the desired evaporation rate. Alternatively the special ink can contain one color former and a transparent dye or pigment such as transparent yellow pigment. A special pencil may be provided with a "lead" comprising similar colorless reactive dye component(s) and/or transparent dyes if pigments dispersed or encapsulated within a hard wax binder material and a solid alcohol such as cetyl alcohol, i.e., similar to "leads" used in colored pencils but containing colorless dye components in place of or in addition to colored dyestuffs or pigments.

FIGS. 5 and 6 illustrate the effect of misuses of the time cards of FIG. 4. In FIG. 5 the signature image 25*a* comprising portions 26 and 27 is applied to the time card 20 before the card is wetted and time stamped. For example, if a worker signs his card in two places when he leaves work or arrives at work, and a cooperative co-worker later wets the card and time stamps it to cover for the worker who arrives late or leaves early, the wet stripe applied by the wetting device will cover the pre-applied signature 15*a* and the dried coating 23*a* will either mask, discolor or otherwise show that the signature 25*a* was not applied contemporaneously with the time clock images 24.

In FIG. 6, the signature 25*b* has been applied after the time card was wetted, time punched with images 24 and dried to leave the dried residue 23*a* of the wet stripe applied by the wetting device. Residue 23*a* seals, masks and/or deactivates the underlying color-forming and/or color-receptive portions 22*a* and 22*b* of card coating 22 so that the color former(s) present in the writing implement used to apply the signature 25*b* is not reactive with the coating 22, or is insulated against reactive contact therewith, so that signature 25*b* is colorless or has or develops a single color rather than the multiple color which would normally be generated if the signature was applied before the wet stripe dried.

It will be apparent to those skilled in the art that a number of different color-forming systems an compositions can be used to accomplish the objectives of the present invention.

According to a preferred embodiment, the wetting solution applied by the wetting device includes film-forming binder material, such as a cellulose ester (ethyl hydroxyethyl cellulose), or a vinyl resin (polyvinyl alcohol, polyvinyl acetate, etc.), or an acrylic resin (ethyl acrylate), or the like, dissolved or dispersed in a volatile vehicle such as water, alcohol or the like. Most preferably, the wetting solution also includes a sufficient amount of an opaque pigment such as titanium dioxide, or an opaque dye, to mask or discolor any images which may be present on the time card before the application of the wet stripe, i.e., signature 15*a* of FIG. 2 or 25*a* of FIG. 5 and further includes a predetermined amount of a less volatile liquid such as propylene glycol to retard the drying rate.

When the wet solution containing the film-forming binder material dries to residue 13*a* or 23*a*, the film former provides a continuous solid carrier film which prevents a later-applied signature 15*b* or 25*b* from making reactive contact with layer 12 or 22 on the time card 10 or 20.

Thus, the masking pigment of the wetting stripe prevents fraud of the types illustrated by FIG. 2 and FIG. 5 and the film-forming binder material prevents fraud of the types illustrated by FIG. 3 and FIG. 6.

It will be apparent that fraud of the types illustrated by FIGS. 2, 3, 5 and 6 can also be avoided by the inclusion in the wetting solution of a third color-forming chemical which must be present in liquid form together with the color-forming chemicals of both the time clock ribbon impressions and the writing implement impressions in order to develop colored image areas 14, 24, and 15 and 25 on the time card coating 12 or 22. For example, some known color-forming reactions require the presence of water, alcohol, a coupling agent or a volatile solvent for one or both of the other color-forming materials or for a binder material within which they are shielded.

It will also be apparent that fraud of the type illustrated by FIGS. 3 and 6 can also be avoided by the inclusion in the wetting solution of an ingredient which deactivates or reacts with the color-forming chemical present in the time card coating 12 and 22, after the wet stripe dries, so that a later-applied signature image 15*b* or 25*b* cannot react therewith to form developed images of the desired color, or does react to form a different color after a volatile ingredient of the wetting solution has evaporated.

A preferred color-forming system for use according to the present invention involves the use of an acid-sensitive color-forming donor chemical, such as a leuco dye, and, in the embodiment of FIGS. 4 to 6, a transparent yellow pigment or dye, of the type conventionally used in highlighting or accent pens, in or on the pressure-sensitive ribbon present within the time clock and also in the color-forming ink or crayon of the writing implement used to write the signature onto the time card, coupled with the use of an inorganic, particulate, acidic, electron-acceptor coating on the time card, such as clay and/or an acidic resin such as an alkyl phenolic resin of the novalak type. Preferably the acidic coating has a pH of from 3.5 to about 5. Such systems are conventional in the carbonless copy field, and reference is made to U.S. Pat. No. 4,406,816 for its disclosure of suitable compositions which can also contain a sufficient amount of transparent pigment to produce colored images in the absence of any reaction. Most preferably the leuco dye and colored pigment are encapsulated and dispersed within a vehicle with which the fabric ribbon is impregnated. Alternatively, the leuco dye and pigment can be dispersed within an oil such as rapeseed oil containing a minor amount by weight of dodecylbenzene, and the fabric ribbon can be impregnated therewith.

Since the foregoing color-forming materials and transparent colored dye or pigments normally react and color on contact, it is necessary that the wetting solution used in association therewith is one which permits contact, reaction and development while it is wet on the acidic coating on the time card, by which prevents contact or normal development or produces a different reaction or color-formation after it has dried to produce colorless signature images 15*b* or single-colored signature images 25*b*.

A preferred wetting solution in this respect is a solution or dispersion of a film-forming material which also includes an opaque pigment or dye, the evaporation of the volatile solvent or vehicle, during drying, resulting in the deposit of a thin opaque barrier film of the binder material. The dry barrier film prevents future applications of the color-forming chemical from contacting the acidic coating 12 or portions 22*a*, to prevent development of colored images 17 or portions 27 of the signature. The opaqueness of the dry barrier layer prevents the show-through of pre-applied images, but images applied while the wetting solution is wet are able to develop because the writing implement pushes the wetting solution aside before the dry barrier film is able to form. Thus, the opaque pigment or dye is also pushed aside in the impressed areas and does not cover and hide the signature.

Another suitable color-forming system involves the use of three necessary chemicals, one present in the time clock ribbon or special ink, together with the transparent pigment or dye, one present in the time card coating and one present in the wetting solution, the latter chemical only being effective while the wetting solution remains wet. For example, the chemical of the wetting solution may be a volatile solvent or reactant such as water, methanol, ethanol, acetone, ethyl acetate, etc., which is a necessary coreactant and/or a necessary solvent to permit the other chemicals to ionize for reaction or to permit the reaction product to develop its color. After the wetting chemical has evaporated the required color-forming reaction cannot occur between the other two chemicals, or they react to produce a clearly different color. Reference is made to U.S. Pat. Nos. 2,936,707 and 3,535,139.

Alternatively, the chemical present in the wetting solution need not be volatile provided that the wetting solution contains a film-forming binder material which deposits a barrier film upon drying. Reference is made to U.S. Pat. Nos. 2,820,760; 2,838,994; 2,873,668 and 2,873,671 for their disclosures of color-forming chemicals necessary to the reaction of two other chemicals.

It will be apparent to those skilled in the art that a wide variety of donor compositions (time clock ribbon coating), receptor compositions (time card coating) and wetting compositions can be selected to carry out the novel system of the present invention.

In cases where the special ink in the writing implement and/or the time clock ribbon containing a colored transparent pigment or dye, such as of yellow, green, blue, orange or other color, the background areas 22*b* of the time card 20 preferably are uncoated since no coating is required in these areas to produce colored portions 24*b* of the time clock images 24 or colored portions 26 of the signature images 25. In such embodiment the coating 22 on the time card 20 is a discontinuous coating applied in the form of closely-spaced stripes, dots, hatchwork or other application of co-reactive composition such as acidic clay to form coating portions 22*a*.

In cases where the special ink is colorless, it contains two different colorless color-forming chemicals, each of which only reacts with different complimentary chemicals present in the different areas 22*a* and 22*b* of the discontinuous coating 22 to produce reaction products having colors which differ from each other. For example the special ink can contain an acid sensitive colorless leuco dye mixed with an alkali-sensitive diazo compound and a coupler, or with a chemical which is not acid-sensitive, and the area 22*a* of the discontinuous coating 22 comprises an acidic compound such as clay and the area 22*b* of the coating 22 comprises an alkaline compound or non-acidic chemical which is reactive with the chemical in the ink to develop a color different from that developed by the leuco dye.

While it is preferable to be able to use conventional time clocks, such as Amano Model 6500 Series NR-7X as disclosed in U.S. Pat. No. 4,227,199, and to use a color-forming donor chemical(s) and/or transparent dye or pigment in place of dye or pigment in the pressure-transfer ribbon thereof, it is possible according to the present invention to use a modified time clock which also functions as a wetting device to apply the wet stripe in the same operation as the punching of the time indicia. In such embodiment, the time indicia can be printed with conventional opaque colored dye or pigment and the wet stripe and receptor coating can be restricted to the signature area of the time card. This is possible because the modified time clock insures the automatic correlation of the time indicia and the location of the signature-enabling wet stripe.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A method for applying multiple-color written indicia and automatically-printed indicia to a record sheet and for correlating the time period during which said different indicia must be applied to said record sheet, comprising the steps of (a) providing a predetermined area of the printing surface of the record sheet with a discontinuous dry coating comprising spaced first areas containing a reactive first color-forming receptor chemical and interposed spaced second areas which are free of said color-forming receptor chemical; (b) automatically wetting said predetermined area with a liquid color-permitting composition which remains liquid on said area for a limited time period; (c) automatically printing indicia on a predetermined area of said record sheet associated with said wetted area of said record sheet using a printing liquid, and (d) applying written indicia to said wetted area while said color-permitting material is still liquid, using a writing liquid containing (1) at least one reactive first color-forming donor chemical which is capable of developing written indicia portions of a first predetermined color upon reaction with the said color-forming first receptor chemical in said first areas in the presence of said liquid color-permitting composition and (2) a color-producing material which is capable of producing written indicia portions of a second predetermined color upon contact with the interposed spaced second areas of the discontinuous dry coating of the record sheet in the presence of said liquid color-permitting composition, whereby said writing liquid forms multiple-color written indicia on said discontinuous dry coating.

2. Method according to claim 1 in which said discontinuous coating comprises first areas containing said first receptor chemical and contiguous interposed spaced second areas which contain a different second color-forming receptor chemical, and the color-producing material of said writing liquid comprises a second color-forming donor chemical capable of producing written indicia portions of a second predetermined color upon contact with said second areas to produce multiple color written indicia on said record sheet.

3. Method according to claim 1 in which said interposed spaced second areas are free of coating material and the color-producing material of said writing liquid comprises a transparent colored pigment or dye.

4. Method according to claim 1 in which said automatically printed indicia are also printed onto the predetermined, wetted portion of the record sheet, using a substantially-colorless printing liquid containing said first reactive color-forming donor chemical which is capable of developing colored printed indicia of said predetermined first color upon reaction with said first color-forming receptor chemical in said first areas, and a said color-producing material which is capable of producing colored printed indicia of a second predetermined color upon contact with the interposed spaced second areas, in the presence of said liquid color-permitting composition.

5. Method according to claim 1 in which said record sheet is a time card, said automatically said printed indicia comprises time stamp indicia printed by means of a time clock and said written indicia comprises a signature written by means or a writing implement containing a supply of said writing liquid.

6. Method according to claim 5 in which the area of said record sheet which is wetted is automatically variable to correspond to the area of the record sheet which is to be printed, whereby automatic pre-wetting of the same area after printing said indicia is prevented.

7. Method according to claim 1 in which said liquid color-permitting composition comprises a volatile solution of a film-forming binder material, the drying of said composition producing a continuous solid barrier film of said binder material which shields the color-forming receptor chemical against subsequent reaction contact with the wetting composition or with the color-forming donor chemical.

8. Method according to claim 1 in which said liquid color-permitting composition is one which is displaced by writing pressure and which dries to form a residue which hides, discolors or otherwise prevents preapplied written indicia from being visually confused with said written indicia applied while said color-permitting liquid is still in the liquid state.

9. Method according to claim 8 in which said liquid color-permitting composition comprises a substantially opaque colorant and a film-forming binder material.

10. Method according to claim 1 in which said liquid color-permitting composition contains a color-forming chemical which is essential to the reaction of the donor and receptor chemicals.

11. A system for applying written indicia to a predetermined first area of a record card adapted to be automatically stamped with printed indicia in a predetermined second area associated with said first area and for correlating the time period during which said different indicia must be applied to said record sheet, comprising (a) a record card having a printing surface comprising dry coating areas containing a reactive color-forming receptor chemical; (b) a wetting device including means for limiting the entry position of said record card to a predetermined variable position and wetting means for automatically wetting a predetermined first area of said record card coating corresponding to said entry position with a color-permitting composition which remains liquid on said card for a limited time period, said wetted area being adapted to develop predetermined colored written indicia portions upon the application thereto of a complimentary writing liquid containing a substantially-colorless reactive donor chemical which is reactive with said receptor chemical in the presence of said color-permitting composition, said donor chemical being present within a writing instrument but being incapable of such development after a brief time period sufficient to dry said color-permitting composition.

12. A system according to claim 11 in which the printing surface of said record card comprises a discontinuous coating comprising spaced coated areas containing said color-forming receptor chemical and contiguous interposed spaced areas which are free of said receptor chemical, and said writing liquid contains another imaging material capable of producing a second predetermined color upon contact with said contiguous interposed spaced areas to produce multiple color written indicia on said receptor sheet.

13. A system according to claim 12 in which said contiguous interposed spaced areas are free of coating material and said writing liquid contains a transparent colored pigment or dye.

14. A system according to claim 11 in which said wetting means is adapted to wet both said first area and said second area of said record card with said color-permitting composition, said wetted areas being adapted to develop colored written and printed indicia, respectively, upon the application thereto of a substantially-colorless complimentary color-forming donor chemical present within a writing instrument and a printing instrument, respectively.

15. A record sheet adapted to be pressure-imaged by predetermined color-reaction means only during a brief time period, said record sheet comprising a flexible carrying a normally dry coating containing at least one reactive color-forming receptor chemical, and a wet coating of a composition which dries after a few minutes exposure to ambient conditions but which, while wet, is pressure-displaceable to permit the imagewise penetration of a complimentary color-forming reactive chemical composition applied by imaging pressure, to produce a color-forming reaction with said receptor chemical but which, when dry, forms a barrier against said imagewise displacement, penetration and color forming reaction.

16. A record sheet according to claim 15 in which the printing surface of said record card comprises a discontinuous coating comprising spaced areas containing said color-forming receptor chemical and contiguous interposed spaced areas which contain a different color-forming receptor chemical which is reactive with a second color-forming reactive chemical present in the composition applied by imaging pressure to produce a different color-forming reaction, to permit the development of discontinuous multiple-color written indicia on said record sheet.

17. A record sheet according to claim 16 in which said contiguous interposed spaced areas are free of coating material and are adapted to be imaged with a chemical composition which also contains a transparent colored pigment or dye, whereby said written indicia consist of different discontinuous color segments.

18. A record sheet 15 in which said dry coating contains said color-forming receptor chemical within pressure-rupturable capsules.

19. A record sheet according to claim 15 in which said wet coating comprises a film-forming material and a volatile vehicle.

20. A record sheet according to claim 15 in which said wet coating comprises an opaque colorant.

21. A time record card designated to receive written indicia in a predetermined first area and to be inserted into a time clock and automatically stamped with printed indicia in a predetermined second area associated with said first area, comprising a time record card having a paperboard foundation having a printing surface comprising discontinuous, closely-spaced dry coating areas containing a reactive color-forming receptor chemical and interposed areas which are free of said chemical, said coating areas being adapted to develop predetermined colored discontinuous written indicia portions upon the application thereto of a complimentary writing liquid containing a substantially-colorless reactive color-forming donor chemical, and said interposed areas being adapted to develop predetermined different colored discontinuous written indicia portions upon the application thereto of a color-producing material, said color-forming donor chemical and said color-producing material being present within a writing instrument used to apply a written signature onto the printing surface of said card, whereby said signature will contain said different colored discontinuous written indicia portions and will be difficult to duplicate or forge by means of other writing instruments.

22. A time record card according to claim 21 in which the printing surface of said record card comprises a discontinuous coating comprising spaced areas containing said color-forming receptor chemical and contiguous interposed spaced areas which contain a different reactive color-forming receptor chemical which is reactive with a second reactive color-forming donor chemical present within said writing liquid to develop a second predetermined color to permit the development of multicolored written indicia on said record sheet.

23. A record sheet according to claim 21 in which said contiguous interposed spaced areas are free of coating material and are adapted to be imaged with a color-producing material comprises a transparent colored pigment or dye contained in said writing liquid, whereby said written indicia consist of different discontinuous color segments.

* * * * *